Aug. 16, 1927.
O. V. GREENE
AIR FILTER
Filed April 3, 1925
1,639,132
2 Sheets-Sheet 1
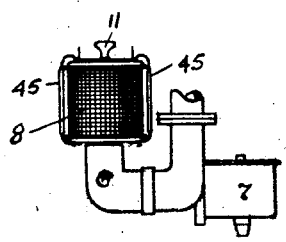
Fig. 1
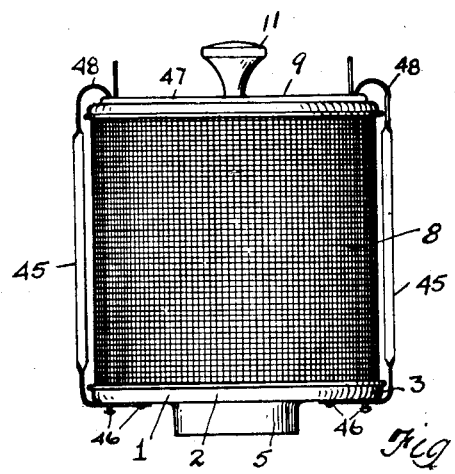
Fig. 2
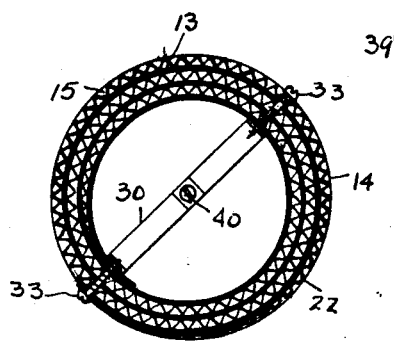
Fig. 4
Fig. 5
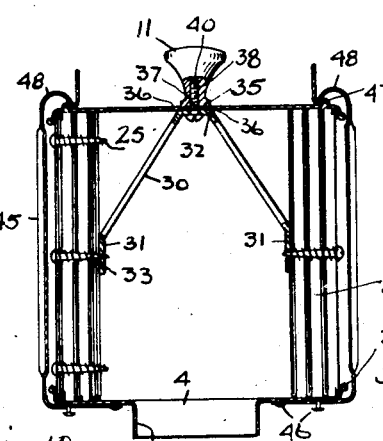
Fig. 3
Fig. 9
Fig. 10
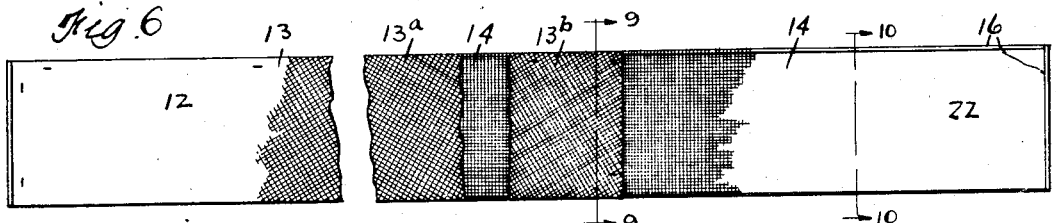
Fig. 6
Fig. 7
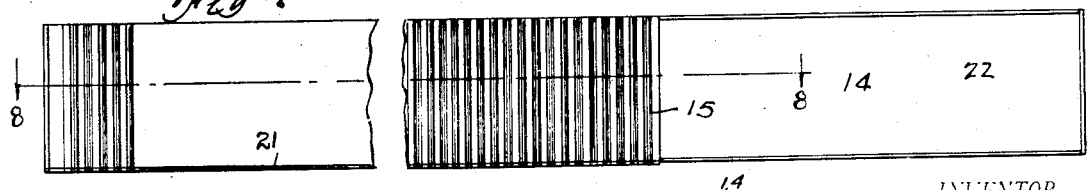
Fig. 8
INVENTOR.
Oscar V. Greene.
BY
Fay, Oberlin & Fay
ATTORNEYS.

Aug. 16, 1927.
O. V. GREENE
1,639,132
AIR FILTER
Filed April 3, 1925
2 Sheets-Sheet 2
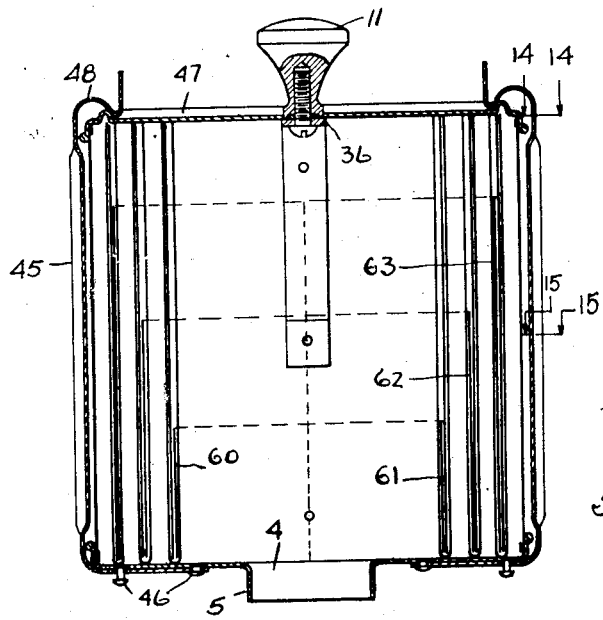
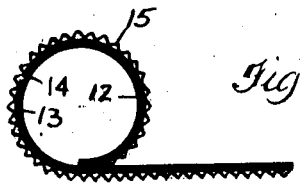
Fig. 11
Fig. 12
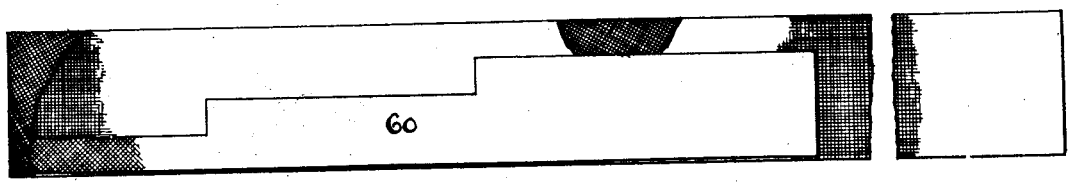
Fig. 13
Fig. 14
Fig. 15.
INVENTOR.
Oscar V. Greene
BY
Fay, Oberlin & Fay
ATTORNEYS Patented Aug. 16, 1927.

1,639,132

UNITED STATES PATENT OFFICE.

OSCAR V. GREENE, OF CLEVELAND, OHIO.

AIR FILTER.

Application filed April 3, 1925. Serial No. 20,400.

The present invention relates to air filters and more particularly to filters adapted for use with internal combustion engines, through which the air must pass to reach the intake valves of the carburetor. The present filter is similar in general construction to the form shown in my co-pending application for United States Letters Patent, filed January 26, 1924, Serial No. 688,715, the filtering element consisting of a series of sheets of screen material wound into a cylinder. The present invention then relates to the particular construction and the arrangement of parts for mounting the unit, the device being so made that the filtering element is easily removable for cleaning and the like. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Fig. 1 is an elevational view showing the device mounted on a carburetor; Fig. 2 is an elevational view of the device itself; Fig. 3 is a central vertical section through the device; Fig. 4 is a bottom plan view of the filter element removed from the holding member; Fig. 5 is a perspective view of the handle; Fig. 6 is a plan view of the screen sheet from which the filtering element is formed; Fig. 7 is a plan view of the filtering sheets with the corrugated screen sheet mounted thereon; Fig. 8 is a diagrammatic section on the line 8—8 of Fig. 7; Figs. 9 and 10 are diagrammatic sectional views on the lines 9—9 and 10—10 respectively of Fig. 6; Fig. 11 is a broken diagrammatic view showing the method of rolling the element; Fig. 12 is a sectional view similar to Fig. 3 showing a modified construction; Fig. 13 is a plan view of the layer of material with the compensating sheets in place; and Figs. 14 and 15 are sectional views on the lines 14—14 and 15—15, respectively, of Fig. 12.

The present air filter for use on internal combustion engines or for any relatively small volume air stream consists of a bottom holding member 1 formed as shown in the shape of a shallow cup or a disk 2 with a flange 3 around the edge, the disk having a central opening 4 and a flange or securing pipe 5 for attachment to the air intake pipe 6 of a carburetor 7 or the like.

The filtering element consists of a hollow cylinder 8 of filtering material, provided at the top with a cover 9 having a knob or handle 11. The filtering element is formed by rolling a layer 12 of filtering material with a layer 15 of corrugated filtering material into a cylinder.

As best shown in Figs. 6 to 10, the layer 12 consists of a strip of screen cloth 13 folded lengthwise and having another strip 14 of screen mounted between the folded portions of the strip 13, the wires of the strip 14 being angularly disposed relative to the wires in the strip 13. The strip 13 is cut on the bias so that when folded, the wires in the portion 13ᵃ run at angles to the wires in the portion 13ᵇ as is clearly indicated on Fig. 6. The strip 14 is longer than the strip 13 and has its edges folded or doubled as at 16.

The corrugated strip 15 of screen cloth preferably having folded in edges 21 is rolled up in conjuction with the layer 12, such layer being placed on the layer 12 as indicated in Fig. 8 and then rolled together as indicated in Fig. 11 so as to form a complete revolution of the layer 12 on the inside of the cylinder and the extending end 22 of the strip 14 is of a length to form a complete revolution around the outside of the cylinder. In the form as shown, there are in the finished element four revolutions of the layer 12 and three spacing revolutions of the corrugated strip 13, and the inner and outer ends of the layer 12 overlap as indicated in Fig. 4.

The cylinder is held in its rolled position by screws 25 which are threaded through the cylinder and such screws form their own threaded openings in the screen and securely tie the rolled cylinder in the desired position.

To hold the cover to the cylinder, a bracket 30, preferably V-shaped, is employed which has its open ends 31 bent to lie flat against the inner cylinder wall and which has a flat portion 32 at the top on a level with the edges of the screen. This bracket has apertures formed in the ends 31 into which screws 33 pass and these screws have threaded engagement in such apertures, thus securing the cylinder and bracket together. The cover has a central opening 35 and two or more indentations or holes 36 and a screw 40 is passed through an aperture 37 in the flat portion 32 of the bracket and through the cover aperture 35 and has threaded engagement with the tapped aperture 38 in the knob. The knob on its lower face is formed with one or more lugs or prongs 39 which fit into the indentations 36 of the cover, thus preventing relative rotation between the cover and the knob when the screw 40 has been tightened.

The bottom edges of the cylinder as shown in Figs. 3, 9 and 10 present folded edges of the several strips of screen used and the raw edges are enclosed by the cover, thus eliminating sharp points and the likelihood of the operator being scratched or injured in handling and removing the element from the holding member, such folded edges also prevent ravelling of the screens.

The cylinder preferably has a tight fit in the holding member but any suitable securing devices may be employed to prevent the element from jarring loose and in the form shown, this holding device consists of a pair of spring clips 45 which are loosely attached to the holding member by a pair of rivets 46, the upper ends being adapted to snap over a rib 47 formed around the cover. These spring clips are preferably bent to form a V-shaped member throughout their extent past the filtering element so as to reduce to a minimum their tendency to block a portion of the filtering element and they are flat at the bottom and at the top where the rebent portions 48 can be snapped over the rib 47 so as to hold the filtering element and cover securely on the holding member. The loose rivets allow the spring clips sufficient movement outwardly from the filtering element so that when they are released from engagement with the cover, the cover and filtering element may easily be withdrawn.

In the form shown in Figs. 12 and 13, the filtering element is provided with compensating devices so as to allow the air currents pulled through the filtering screens to enter substantially equally over the entire area of the element. It is of course known that in a device as shown, the air current will tend to pass through the bottom of the element nearest the opening in the holding member in greater quantity and at higher velocity than through the upper portion of the element and therefore in the construction shown in Fig. 12, a sheet 60 of compensating screen is employed which, when the element is rolled up, give a series of single revolutions of extra screen material of varying heights. As shown, this compensating sheet is so made that when the element is rolled up, there will be a layer of the compensating sheet forming a single revolution 61 in the first revolution of the layer and this first compensating revolution extends only a limited distance up the wall of the element. The second portion 62 of the compensating element makes also a single revolution and extends upwardly in the element a greater distance than the first and the third portion 63 of the compensating sheet makes a complete revolution in the filtering element and extends higher than the second compensating element. Thus in the finished structure, the filtering element has its greatest density near the bottom or outlet end of the device and this density decreases toward the top of the filtering element, thus giving an increased resistance from the top of the element to the bottom thereof so as to force the air equally through the element at all times. This compensating means is similar to that shown in my co-pending application filed March 27, 1925, Serial Number 18,768, in which compensating devices are shown for the filter element where the element is arranged as substantially a rectangular unit.

In using the present air cleaners for internal combustion engines, it is preferable to remove the filter proper from the holding member and to dip the same in oil so as to coat the wires of the various sheets of screen material which aids in filtering the air. The number of revolutions of the filtering material, the size of screen mesh employed and the number and fineness of the compensating elements will of course vary with the particular operating conditions which the device is to meet. The filtering element is easily removable for cleaning and provides a satisfactory filtering medium and one which can be readily installed or removed from an internal combustion engine without the use of special tools or equipment.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A filter element consisting of a sheet of screen rolled to form a hollow cylinder and provided with a cover at one end, said filtering cylinder increasing in density from such cover end to the other.

2. A filtering element consisting of a hollow cylinder of screen, said cylinder consisting of a layer of flat screen and a sheet of corrugated screen rolled into shape and provided with compensating screen adapted to increase the density of said element from one end to the other.

3. A filter element consisting of a hollow cylinder of woven wire screen, comprising a layer of flat screen and a shorter length of corrugated screen placed in juxtaposition and rolled together into such cylinder and providing therein a series of spaced revolutions of filtering screens, a cover for one end of said cylinder having a handle, and a removable holding member for the other end of said cylinder.

4. A filter element consisting of a hollow cylinder of woven wire screen, comprising a layer of screen and a shorter length of corrugated screen placed in juxtaposition and rolled together into such cylinder and providing therein a series of spaced revolutions of filtering screens, a cover for one end of said cylinder having a handle, and means mounted on said holding member and adapted for removable engagement with said cover for securing said element on said member.

5. A filter element consisting of a hollow cylinder of woven wire screen, comprising a layer of screen and a shorter length of corrugated screen placed in juxtaposition and rolled together into such cylinder and providing therein a series of spaced revolutions of filtering screens, a cover for one end of said cylinder having a handle, means for attaching said cover to said cylinder, consisting of a bracket mounted interiorly of said cylinder adapted to be secured to the walls thereof, and means for attaching said bracket to said cover.

6. A filter element consisting of a hollow cylinder of woven wire screen, comprising a layer of screen and a shorter length of corrugated screen placed in juxtaposition and rolled together into such cylinder and providing therein a series of spaced revolutions of filtering screens, a bracket mounted in said cylinder and secured thereto and having a portion flush with one edge of said cylinder, a cover mounted on the end of said cylinder, and means securing said cover to said bracket.

7. A filter element consisting of a hollow cylinder of woven wire screen, comprising a layer of screen and a shorter length of corrugated screen placed in juxtaposition and rolled together into such cylinder and providing therein a series of spaced revolutions of filtering screens, a bracket mounted in said cylinder and secured thereto and having a portion flush with one edge of said cylinder, said portion having an aperture, a cover mounted over the end of said cylinder and having an aperture, a handle mounted on the outside of said cover, and a holding screw passing through said bracket and cover and engaging said handle to clamp said cover to said bracket and said handle to said cover.

8. A filter element consisting of a hollow cylinder of woven wire screen, comprising a layer of screen and a shorter length of corrugated screen placed in juxtaposition and rolled together into such cylinder and providing therein a series of spaced revolutions of filtering screens, a bracket mounted in said cylinder and secured thereto and having a portion flush with one edge of said cylinder, said portion having an aperture, a cover mounted over the end of said cylinder and having an aperture, a handle mounted on the outside of said cover, a holding screw passing through said bracket and cover and engaging said handle to clamp said cover to said bracket and said handle to said cover, and interengaging means on said handle and cover and preventing rotation of said handle when in its clamped position.

9. A cylindrical filter element consisting of a relatively long layer of flat woven wire screen, a shorter length of corrugated woven wire screen adjacent thereto, said two layers being rolled together to form a hollow cylinder with the corrugated screen between the flat screen leaving a complete revolution of the straight screen on both the inside and the outside of the cylinder.

10. A cylindrical filter element consisting of a relatively long layer of flat woven wire screen, a shorter length of corrugated woven wire screen adjacent thereto, said two layers being rolled together to form a hollow cylinder with the corrugated screen between the flat screen leaving a complete revolution of the straight screen on both the inside and the outside of the cylinder, one edge of both corrugated and flat screen being doubled in so as to form one end of said cylinder with no sharp wire ends.

11. A filter element consisting of layers of spaced foraminous sheets formed into a hollow cylinder, the inside layer of said cylinder being of greater density than the outside layer thereof.

12. A filter element comprising a plurality of layers of foraminous material formed into a hollow cylinder, the outside layer of said element being of less density than the inner layers thereof.

13. A filter element consisting of layers of spaced foraminous sheets formed into a hollow cylinder, said filtering element increasing in density from one end of said cylinder to the other.

14. A filter element consisting of a sheet of foraminous material rolled to form a hollow cylinder and having a cover at one end, said filtering cylinder increasing in density from such cover end to the other.

15. A filter element consisting of a hollow cylinder of foraminous material, said cylinder consisting of a layer of a flat foraminous sheet and a corrugated foraminous sheet rolled into shape and provided with a compensating sheet rolled therein and adapted to increase the density of said cylinder from one end to the other.

16. A filter element comprising a strip of woven wire screen, a second strip of woven wire screen placed in juxtaposition to said first strip and having its wires angularly related to the wires of said first strip, said two strips being rolled to form a hollow cylinder of several layers.

Signed by me this 31st day of March, 1925.

OSCAR V. GREENE.